US012752349B2

(12) United States Patent
Hatano

(10) Patent No.: US 12,752,349 B2
(45) Date of Patent: Oct. 6, 2026

(54) CUTTING INSERT, CUTTING TOOL, AND METHOD FOR MANUFACTURING MACHINED PRODUCT

(71) Applicant: KYOCERA CORPORATION, Kyoto (JP)

(72) Inventor: Hirokazu Hatano, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 217 days.

(21) Appl. No.: 18/846,656

(22) PCT Filed: Mar. 8, 2023

(86) PCT No.: PCT/JP2023/008795
§ 371 (c)(1),
(2) Date: Sep. 13, 2024

(87) PCT Pub. No.: WO2023/176618
PCT Pub. Date: Sep. 21, 2023

(65) Prior Publication Data

US 2025/0196235 A1 Jun. 19, 2025

(30) Foreign Application Priority Data

Mar. 15, 2022 (JP) ................................ 2022-040642

(51) Int. Cl.
*B23C 5/06* (2006.01)

(52) U.S. Cl.
CPC .......... *B23C 5/06* (2013.01); *B23C 2200/203* (2013.01)

(58) Field of Classification Search
CPC ........ B23B 2200/201; B23B 2200/202; B23C 5/06; B23C 5/202; B23C 2200/0422; B23C 2200/203; B23C 2200/0455; B23C 2200/208
See application file for complete search history.

(56) References Cited

U.S. PATENT DOCUMENTS 4,681,488 A * 7/1987 Markusson ............. B23C 5/202 407/113
7,547,164 B2 * 6/2009 Hessman ................ B23C 5/202 407/66
8,485,764 B2 * 7/2013 Xu .......................... B23C 5/202 407/113

(Continued)

FOREIGN PATENT DOCUMENTS

DE 112017003488 T5 4/2019
DE 102020115987 A1 * 1/2021 ............. B23C 5/202

(Continued)

*Primary Examiner* — Nicole N Ramos
(74) *Attorney, Agent, or Firm* — HAUPTMAN HAM, LLP

(57) ABSTRACT

A minor cutting edge in a cutting insert of one aspect has a protruding curved shape protruding upward in a side view and includes: a first portion including an apex portion protruding most upward in the minor cutting edge; a second portion located between the first portion and a connection edge; and a third portion located between the second portion and the connection edge. Each of the second portion and the third portion comes close to a lower surface with distance from the first portion. In the side view, a radius of curvature of the second portion is larger than a radius of curvature of the first portion and a radius of curvature of the third portion.

9 Claims, 8 Drawing Sheets

(56) References Cited

U.S. PATENT DOCUMENTS

| | | | | |
|---|---|---|---|---|
| 8,961,076 | B2 * | 2/2015 | Ishi | B23C 5/202 407/42 |
| 9,975,188 | B2 * | 5/2018 | Roman | B23C 5/06 |
| 11,529,692 | B2 * | 12/2022 | Burtscher | B23C 5/202 |
| 2003/0031520 | A1 * | 2/2003 | Hintze | B23B 27/141 407/116 |
| 2004/0146365 | A1 * | 7/2004 | Usui | B23B 27/145 407/113 |
| 2007/0003384 | A1 * | 1/2007 | Smilovici | B23C 5/2213 407/113 |
| 2010/0150671 | A1 * | 6/2010 | Oprasic | B23C 5/2208 407/42 |
| 2012/0093596 | A1 * | 4/2012 | Ishi | B23C 5/202 407/113 |
| 2014/0010605 | A1 | 1/2014 | Smilovici et al. | |
| 2014/0126970 | A1 | 5/2014 | Maeta et al. | |
| 2016/0158854 | A1 * | 6/2016 | Ishi | B23C 5/06 409/131 |
| 2017/0113286 | A1 | 4/2017 | Nam et al. | |
| 2019/0240740 | A1 | 8/2019 | Sakai | |
| 2024/0001462 | A1 * | 1/2024 | Lee | B23C 5/205 |

FOREIGN PATENT DOCUMENTS

| | | | | |
|---|---|---|---|---|
| EP | 3072617 | A1 * | 9/2016 | B23C 5/202 |
| EP | 3542936 | A1 * | 9/2019 | B23C 5/205 |
| KR | 102305441 | B1 * | 9/2021 | B23C 5/202 |
| WO | 2013077443 | A1 | 5/2011 | |

* cited by examiner

CUTTING INSERT, CUTTING TOOL, AND METHOD FOR MANUFACTURING MACHINED PRODUCT

CROSS-REFERENCE TO RELATED APPLICATIONS

This application is national stage application of International Application No. PCT/JP2023/008795, filed on Mar. 8, 2023, which claims priority to Japanese Patent Application No. 2022-040642, filed on Mar. 15, 2022.

TECHNICAL FIELD

The present disclosure relates to a cutting insert, a cutting tool, and a method for manufacturing a machined product.

BACKGROUND OF INVENTION

An example of a cutting tool is a so-called rotary tool. Rotary tools include an end mill and a milling tool.

A cutting insert disclosed in Patent Document 1 is known as a cutting insert applied to a cutting tool. The cutting insert described in Patent Document 1 is a so-called double-sided insert having cutting edges on an upper surface side and a lower surface side. The cutting edges in Patent Document 1 have a minor cutting edge (so-called flat cutting edge) for finish machining. The minor cutting edge has a protruding curved shape protruding upward in a side view. Patent Document 1 illustrates, as specific shapes of the minor cutting edge, an arc shape having a constant curvature and a protruding curved shape having a curvature gradually decreasing toward both ends in the side view.

CITATION LIST

Patent Literature

Patent Document 1: WO 2013/077443

SUMMARY

A cutting insert according to an aspect of the present disclosure includes: an upper surface; a lower surface located on an opposite side of the upper surface; a lateral surface connected to the upper surface and the lower surface; a upper cutting edge located on an intersection between the upper surface and the lateral surface; and a lower cutting edge located on an intersection between the lower surface and the lateral surface. The upper surface includes a first corner, a first side connected to the first corner, and a second side connected to the first corner on an opposite side of the first side. The upper cutting edge includes a main cutting edge located on the first side and having a linear shape in a top view, a minor cutting edge located on the second side and having a linear shape in the top view, and a connection edge located on the first corner, connected to the main cutting edge and the minor cutting edge, and having a protruding shape (protruding curved shape) protruding outward in the top view. The minor cutting edge has a protruding curved shape protruding upward in a side view and includes a first portion including an apex portion protruding most upward in the minor cutting edge, a second portion located between the first portion and the connection edge, and a third portion located between the second portion and the connection edge. Each of the second portion and the third portion comes close to the lower surface with distance from the first portion. In the side view, a radius of curvature of the second portion is larger than a radius of curvature of the first portion and a radius of curvature of the third portion.

A cutting tool includes: a holder having a cylindrical shape extending from a first end to a second end along a rotation axis and including a pocket located on a side of the first end; and the cutting insert according to an aspect of the present disclosure located in the pocket.

A method for manufacturing a machined product according to an aspect of the present disclosure includes: rotating the cutting tool according to an aspect of the present disclosure; bringing the cutting tool rotating into contact with a workpiece; and separating the cutting tool from the workpiece.

DESCRIPTION OF EMBODIMENTS

Figure 1:
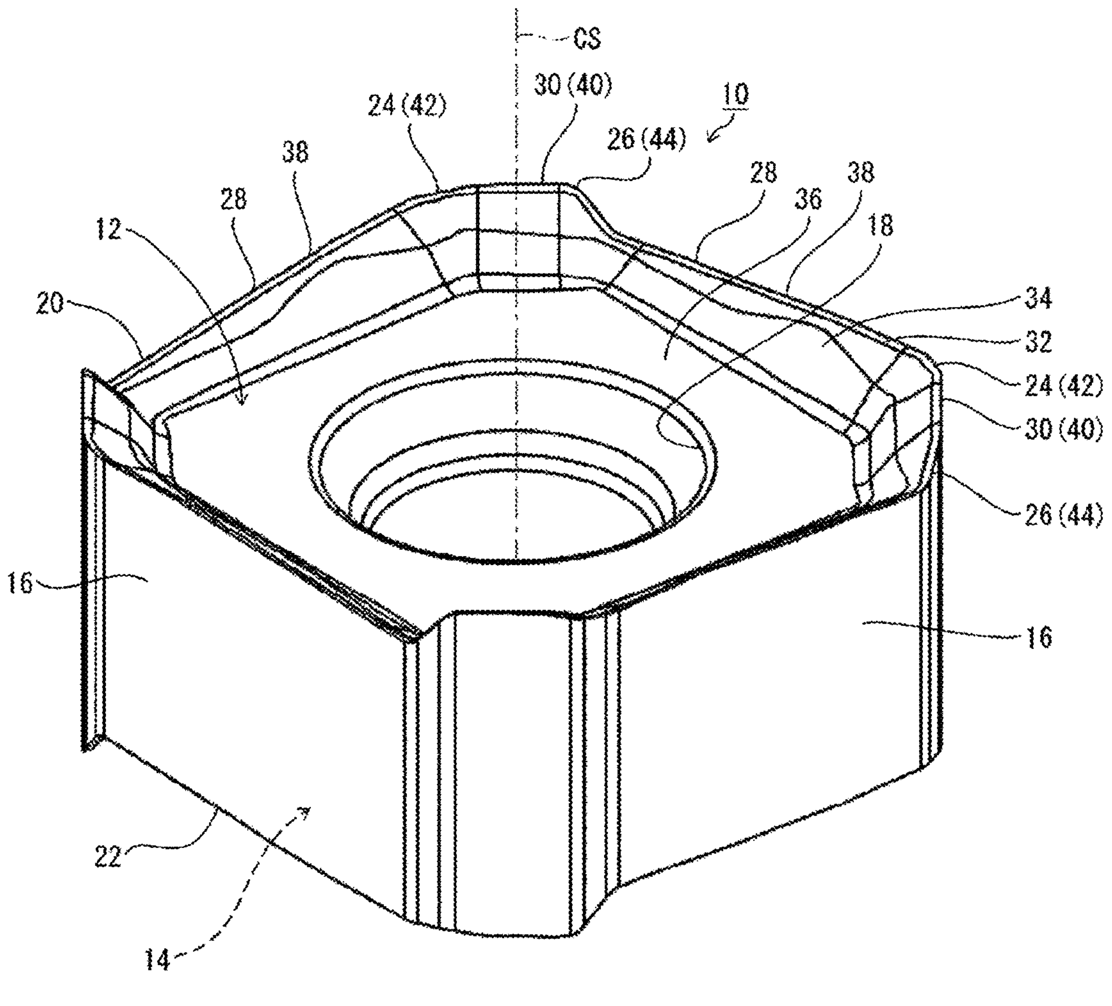
FIG. 1 is a schematic perspective view of a cutting insert according to an embodiment of the present disclosure.

When a double-sided insert such as the cutting insert described in Patent Document 1 is attached to a holder of a cutting tool, the axial rake of the cutting insert needs to be set to a negative value. Therefore, when the minor cutting edge has the shape illustrated in Patent Document 1, a region of the minor cutting edge that can be used as a flat cutting edge is limited, and finish machining may not be sufficiently performed on a workpiece. As a result, it is desired to improve surface accuracy (surface roughness) of the machined surface of the workpiece.

The present disclosure can improve the surface accuracy of the machined surface of the workpiece.

A cutting insert, a cutting tool, and a method for manufacturing a machined product according to an embodiment of the present disclosure will be described below in detail with reference to the drawings. However, each of the drawings, which will be referred to below, is a simplified representation of only components necessary for description of the embodiment, for convenience of description. Accordingly, the cutting insert and the cutting tool according to an embodiment of the present disclosure may be provided with an optional component that is not illustrated in each of the referred drawings. The dimensions of the components in the drawings do not faithfully represent the actual dimensions of the components, the dimension ratios of the members, or the like.

In the present disclosure, the insert central axis refers to a virtual axis passing through the center of the upper surface of the cutting insert and the center of the lower surface of the cutting insert. The term "inward direction" or "inner side" refers to a direction toward or a side closer to the insert central axis in the cutting insert. The term "outward direction" or "outer side" refers to a direction or a side away from the insert central axis in the cutting insert. The term "orthogonal" is not limited to being strictly orthogonal and means that an error of approximately +5 degrees is allowed. The term "parallel" is not limited to being strictly parallel and means that an error of about +5 degrees is allowed.

Cutting Insert

Figure 2:
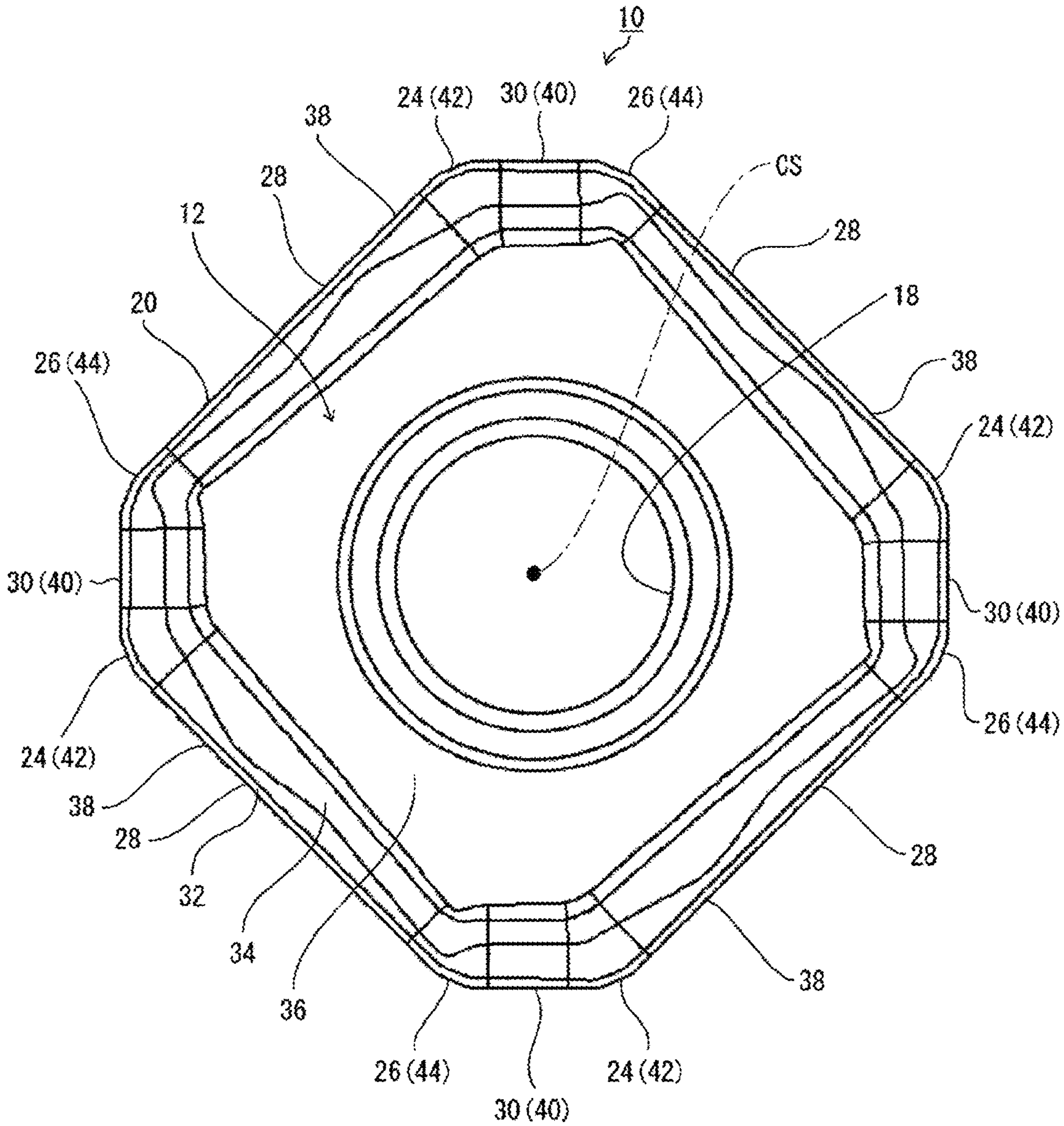
FIG. 2 is a schematic plan view of the cutting insert illustrated in FIG. 1.
Figure 3:
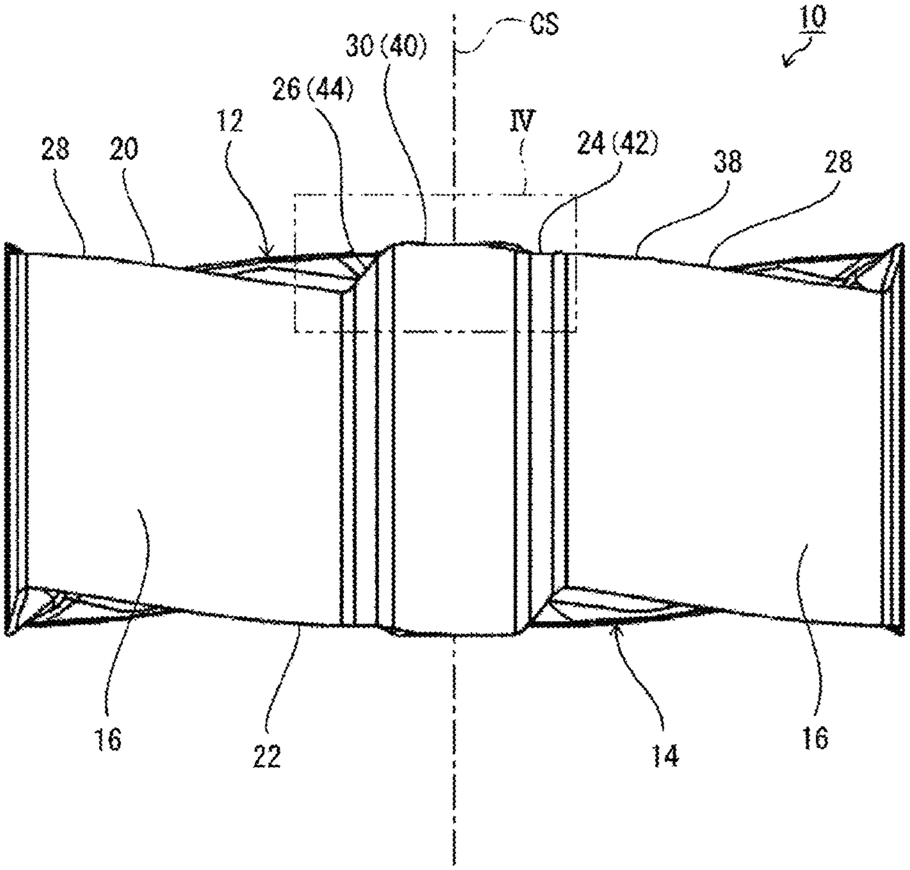
FIG. 3 is a schematic side view of the cutting insert illustrated in FIG. 1.
Figure 4:
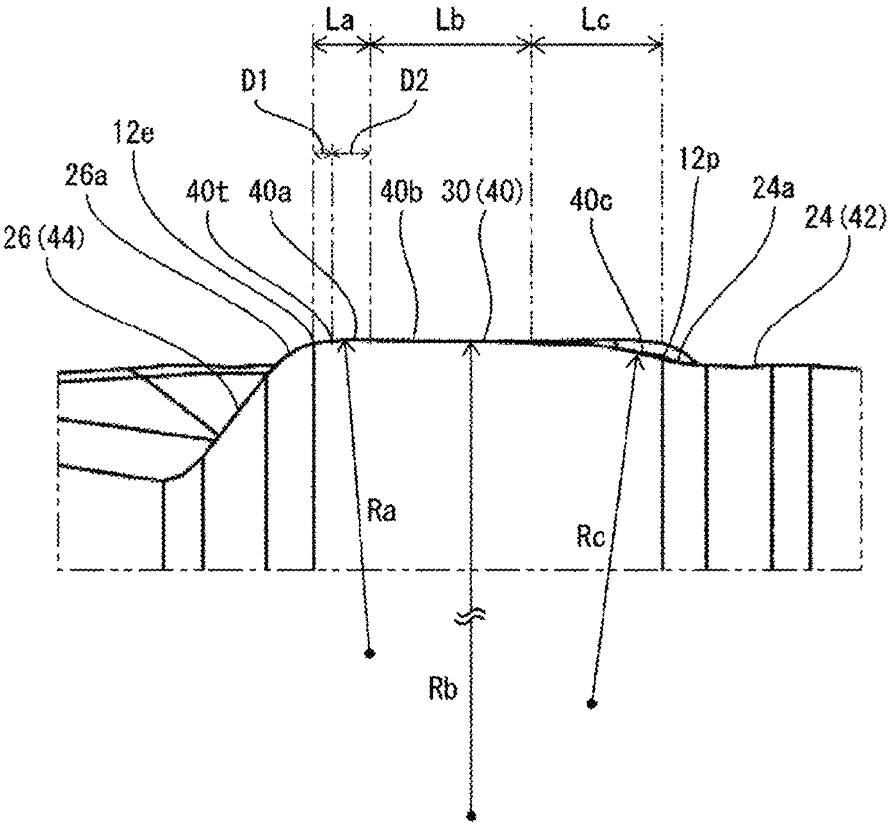
FIG. 4 is an enlarged view of a part IV in FIG. 3.

A cutting insert 10 according to an embodiment of the present disclosure will be described with reference to FIGS. 1 to 4. FIG. 1 is a schematic perspective view of the cutting insert 10 according to the embodiment of the present disclosure. FIG. 2 is a schematic plan view of the cutting insert 10 illustrated in FIG. 1. FIG. 3 is a schematic side view of the cutting insert 10 illustrated in FIG. 1. Note that FIG. 3 is a side view from the direction in which a second side described below is viewed from the front. FIG. 4 is an enlarged view of a part IV in FIG. 3.

The cutting insert 10 according to the embodiment of the present disclosure is a component of a cutting tool used for machining of a workpiece W (see FIG. 7) made of a metal material or the like. Examples of the machining of the workpiece W include shoulder machining, grooving, R machining, and profiling.

As in the examples illustrated in FIGS. 1 to 3, the cutting insert 10 may include an upper surface 12 and a lower surface 14 located on the opposite side of the upper surface 12. Each of the upper surface 12 and the lower surface 14 may have a polygonal shape, for example, an octagonal shape. In other words, the cutting insert 10 may have a polygonal plate shape, for example, an octagonal plate shape. Each of the upper surface 12 and the lower surface 14 may have a polygonal shape, for example, a triangular shape, a quadrangular shape, or the like other than the octagonal shape. In other words, the cutting insert 10 may have a polygonal plate shape, for example, a triangular plate shape, a quadrangular plate shape, or the like other than the octagonal plate shape. The polygonal shape is not limited strictly to a shape of a polygon.

As in the example illustrated in FIG. 2, each of the upper surface 12 and the lower surface 14 may have a rotationally symmetrical shape at a constant angle with respect to an insert central axis CS. The upper surface 12 and the lower surface 14 may be shaped such that the front and back sides are reversed and symmetrical. In other words, the cutting insert 10 may have a rotationally symmetrical shape at a constant angle with respect to the insert central axis CS or may be shaped such that the front and back sides are reversed and symmetrical.

As in the examples illustrated in FIG. 1 and FIG. 3, the cutting insert 10 may include a plurality of lateral surfaces 16 located between the upper surface 12 and the lower surface 14. The lateral surface 16 may be connected to the upper surface 12 and the lower surface 14. The lateral surfaces 16 may function as flank faces and may be parallel to the insert central axis CS. The cutting insert 10 is a so-called negative type cutting insert having a clearance angle of 0 degrees.

The cutting insert 10 may include a mounting hole 18 penetrated from the upper surface 12 to the lower surface 14 as in the examples illustrated in FIGS. 1 to 3. One opening of the mounting hole 18 may be located in a central portion of the upper surface 12, and the other opening of the mounting hole 18 may be located in a central portion of the lower surface 14. The central axis of the mounting hole 18 may coincide with the insert central axis CS.

As in the examples illustrated in FIG. 1 and FIG. 2, the cutting insert 10 may include a upper cutting edge 20 and a lower cutting edge 22. The upper cutting edge 20 may be located on an intersection between the upper surface 12 and the lateral surface 16. The lower cutting edge 22 may be located on an intersection between the lower surface 14 and the lateral surface 16. In other words, the cutting insert 10 may be a double-sided insert provided with the upper cutting edge 20 and the lower cutting edge 22. The upper cutting edge 20 may be located on the entire intersection between the upper surface 12 and the lateral surface 16 or may be located on part of the intersection between thereof. The lower cutting edge 22 may be located on the entire intersection between the lower surface 14 and the lateral surface 16 or may be located on part of the intersection between thereof.

As in the example illustrated in FIG. 2, the upper surface 12 formed in a polygonal shape may include a first corner 24 as one of a plurality of corners and a second corner 26 as one other of a plurality of corners. Each of the first corner 24 and the second corner 26 may have a protruding curved shape protruding in an outward direction in a top view.

As in the examples illustrated in FIG. 1 and FIG. 2, the upper surface 12 may include a first side 28 connected to the first corner 24 and a second side 30 connected to the first corner 24 on the opposite side of the first side 28. The second corner 26 may be connected to the second side 30 on the opposite side of the first corner 24. The first side 28 may have a linear shape in the top view or may come close to the lower surface 14 with distance from the first corner 24 in a side view. The second side 30 may have a linear shape in the top view.

In the top view, the first side 28 and the second side 30 are not limited to the linear shape, and may have, for example, a gently protruding curved shape protruding in an outward direction. Here, "having a gently protruding curved shape" means having a radius of curvature larger than radii of curvature of the first corner 24 and the second corner 26 that have a protruding curved shape.

In a case, the upper surface 12 has a rotationally symmetrical shape at a certain angle about the insert central axis CS, the upper surface 12 may have a plurality of the first corners 24 and a plurality of the second corners 26 as in the example illustrated in FIG. 2. In this case, the plurality of first corners 24 and the plurality of second corners 26 may be alternately located along the peripheral direction of the upper surface 12.

The upper surface 12 may also include a plurality of the first sides 28 and a plurality of the second sides 30. In a case, the upper surface 12 includes the plurality of first corners 24, the plurality of second corners 26, the plurality of first sides 28, and the plurality of second sides 30, the evaluation described below may be performed by focusing on portions extracted one by one from these portions such that the aforementioned positional relationship is provided.

As in the examples illustrated in FIGS. 1 and 2, the upper surface 12 may include a land portion 32 located at the peripheral edge portion thereof, and the land portion 32 may be connected to the upper cutting edge 20. The land portion 32 may function to enhance edge strength of the upper cutting edge 20. The land portion 32 may be a portion that is adjacent to the upper cutting edge 20 and is indicated by a straight line in a cross-section orthogonal to the upper cutting edge 20 in the top view.

The upper surface 12 may also include a rake surface 34 located on the inner side of the land portion 32, and the rake surface 34 may be connected to the land portion 32. The rake surface 34 may be inclined with respect to the land portion 32 and may come close to the lower surface 14 with distance from the land portion 32.

As in the examples illustrated in FIG. 1 and FIG. 2, the upper surface 12 may include a bottom surface 36 located on the inner side of the rake surface 34, and the bottom surface 36 may be connected to the rake surface 34. The bottom surface 36 may surround the opening of the mounting hole 18, and may be orthogonal to the insert central axis CS.

As illustrated in the examples illustrated in FIGS. 1 to 3, the upper cutting edge 20 may include a main cutting edge 38 located on the first side 28. The main cutting edge 38 is a portion that can function as a main cutting edge in machining the workpiece W. The main cutting edge 38 may be located over the entirety of the first side 28 or may be located over a portion of the first side 28. The main cutting edge 38 may have a linear shape in the top view.

As in the examples illustrated in FIGS. 1 to 4, the upper cutting edge 20 may include a minor cutting edge 40 located on the second side 30. The minor cutting edge 40 may function as a flat cutting edge for finishing the machined surface of the workpiece W. The minor cutting edge 40 may be located over the entirety of the second side 30 or may be located over a portion of the second side 30. The minor cutting edge 40 may have a linear shape in the top view.

As in the examples illustrated in FIGS. 1 to 3, the upper cutting edge 20 may include a first connection edge (connection edge) 42 located on the first corner 24, and the first connection edge 42 may be connected to the main cutting edge 38 and the minor cutting edge 40. The first connection edge 42 may have a protruding curved shape protruding outward in the top view. The upper cutting edge 20 may also include a second connection edge 44 located on the second corner 26, and the second connection edge 44 may be connected to the minor cutting edge 40. The second connection edge 44 may have a protruding curved shape protruding outward in the top view.

As in the example illustrated in FIG. 4, the minor cutting edge 40 may have a protruding curved shape protruding upward in the side view. The minor cutting edge 40 may include a first portion 40*a* including an apex portion 40*t* protruding most upward in the minor cutting edge 40, a second portion 40*b* located between the first portion 40*a* and the first connection edge 42, and a third portion 40*c* located between the second portion 40*b* and the first connection edge 42.

As in the example illustrated in FIG. 4, in the side view, a length Lb of the second portion 40*b* of the minor cutting edge 40 may be longer than a length La of the first portion 40*a* and a length Lc of the third portion 40*c*. The length of the third portion 40*c* of the minor cutting edge 40 may be greater than the length of the first portion 40*a*. Each of the second portion 40*b* and the third portion 40*c* of the minor cutting edge 40 may come close to the lower surface 14 with distance from the first portion 40*a*.

Note that the aforementioned "length La" means the width of the first portion 40*a* in the direction orthogonal to the insert central axis CS in a side view of the insert 10. Similarly, the aforementioned "length Lb" means the width of the second portion 40*b* in the direction orthogonal to the insert central axis CS in a side view of the insert 10, and the aforementioned "length Lc" means the width of the third portion 40*c* in the direction orthogonal to the insert central axis CS in a side view of the insert 10.

As in the example illustrated in FIG. 4, in the side view, a radius of curvature Rb of the second portion 40*b* of the minor cutting edge 40 may be larger than a radius of curvature Ra of the first portion 40*a* and a radius of curvature Rc of the third portion 40*c*. In other words, in the side view, the radius of curvature of the second portion 40*b* of the minor cutting edge 40 may be smaller than the radius of curvature of the first portion 40*a* and the radius of curvature of the third portion 40*c*. In the side view, the radius of curvature Rc of the third portion 40*c* of the minor cutting edge 40 may be larger than the radius of curvature Ra of the first portion 40*a*. In other words, in the side view, the radius of curvature of the third portion 40*c* of the minor cutting edge 40 may be smaller than the radius of curvature of the first portion 40*a*. A distance D1 from the apex portion 40*t* of the minor cutting edge 40 to the second corner 26 may be shorter than a distance D2 from the apex portion 40*t* to the second portion 40*b*. In FIG. 4, the radius of curvature Ra of the first portion 40*a*, the radius of curvature Rb of the second portion 40*b*, and the radius of curvature Rc of the third portion 40*c* of the minor cutting edge 40 are schematically illustrated.

As in the example illustrated in FIG. 4, a boundary 12*p* between the second side 30 and the first corner 24 may be located closer to the lower surface 14 than a boundary 12*e* between the second side 30 and the second corner 26. The first corner 24 may include a first connection region 24*a* connected to the second side 30, and the first connection region 24*a* may have a recessed curved shape recessed downward in the side view. The second corner 26 may include a second connection region 26*a* connected to the second side 30, and the second connection region 26*a* may have a protruding curved shape protruding upward in the side view.

The positions of the boundary 12*e* and the boundary 12*p* may be specified by a top surface view of the cutting insert 10. For example, if the first corner 24 and the second corner 26 have a protruding curved shape and the second side 30 has a linear shape in the top view, a virtual straight line along the second side 30 is set, and portions away from the virtual straight line may be regarded as the boundary 12*e* and the boundary 12*p*. If the first corner 24 and the second corner 26 have a protruding curved shape and the second side 30 has a gentle protruding curved shape in the top view, a virtual arc along the second side 30 is set, and portions away from the virtual arc may be regarded as the boundary 12*e* and the boundary 12*p*

As in the examples illustrated in FIGS. 1 to 3, if the upper surface 12 and the lower surface 14 are shaped such that the front and back sides are reversed and symmetrical, the lower surface 14 may include portions corresponding to the first corner 24, the second corner 26, the first side 28, the second side 30, the land portion 32, and the rake surface 34 of the upper surface 12. The configurations of the portions of the lower surface 14, which correspond to the first corner 24, the second corner 26, the first side 28, the second side 30, the land portion 32, and the rake surface 34 may be the same as and/or similar to the configurations of the first corner 24, the second corner 26, the first side 28, the second side 30, the land portion 32, and the rake surface 34 of the upper surface 12 except that the positional relationship in the vertical direction is reversed.

As in the examples illustrated in FIGS. 1 to 3, if the upper surface 12 and the lower surface 14 are shaped such that the front and back sides are reversed and symmetrical, the lower cutting edge 22 may include portions corresponding to the main cutting edge 38, the minor cutting edge 40, the first connection edge 42, and the second connection edge 44 of the upper cutting edge 20. The configurations of the portions of the lower cutting edge 22, which correspond to the main cutting edge 38, the minor cutting edge 40, the first connection edge 42, and the second connection edge 44 may be the same as and/or similar to the configurations of the main cutting edge 38, the minor cutting edge 40, the first connection edge 42, and the second connection edge 44 of the upper cutting edge 20 except that the positional relationship in the vertical direction is reversed.

An example of the material of the cutting insert 10 includes a cemented carbide alloy or a cermet. Examples of the composition of the cemented carbide alloy include WC—Co produced by adding a cobalt (Co) powder to tungsten carbide (WC) and sintering the mixture, WC—TiC—Co formed by adding titanium carbide (TiC) to WC—Co, or WC—TiC—TaC—Co formed by adding tantalum carbide (TaC) to WC—TiC—Co. The cermet is a sintered composite material obtained by combining a metal with a ceramic component and specific examples thereof include titanium compounds in which a titanium compound such as titanium carbide (TiC) or titanium nitride (TiN) is the main component.

The surface of the cutting insert 10 may be coated with a coating film using a chemical vapor deposition (CVD) method or a physical vapor deposition (PVD) method. Examples of the composition of the coating film include titanium carbide (TiC), titanium nitride (TiN), titanium carbonitride (TiCN), and alumina ($Al_2O_3$).

As in the example illustrated in FIG. 4, the minor cutting edge 40 has a protruding curved shape protruding upward in the side view. Each of the second portion 40*b* and the third portion 40*c* of the minor cutting edge 40 comes close to the lower surface 14 with distance from the first portion 40*a*. The radius of curvature Rb of the second portion 40*b* of the minor cutting edge 40 is larger than the radius of curvature Ra of the first portion 40*a* and the radius of curvature Rc of the third portion 40*c*.

In this case, the second portion 40*b* which is a gently curved portion can be disposed on the center side of the minor cutting edge 40, and the first portion 40*a* and the third portion 40*c* which are steepish curved portions can be disposed on both end sides of the minor cutting edge 40. Therefore, even if the axial rake angle of the cutting insert 10 is set to be negative, a wide region from the first portion 40*a* to the third portion 40*c* of the minor cutting edge 40 can be used as a flat cutting edge.

This allows the example of the embodiment of the present disclosure to improve surface accuracy (surface roughness) of the machined surface of the workpiece. In particular, since the first portion 40*a* including the apex portion 40*t* is a steepish curved portion, biting of the minor cutting edge 40 into the workpiece W is improved, and the surface accuracy of the machined surface of the workpiece W can be sufficiently improved.

Of the first portion 40*a* to the third portion 40*c* of the minor cutting edge 40, the third portion 40*c* located closest to the first connection edge 42 is a steepish curved portion.

Therefore, the example of the embodiment of the present disclosure can improve subsequent biting of the cutting insert 10 into the workpiece W during machining and reduce the occurrence of so-called tear by having the thickness of chips.

If the length of the second portion 40*b* of the minor cutting edge 40 is greater than the length of the first portion 40*a* and the length of the third portion 40*c*, the gentle portion of the minor cutting edge 40 is longer, and thus the surface accuracy of the machined surface of the workpiece W can be further improved.

If the first connection region 24*a* of the first corner 24 has a recessed curved shape and the second connection region 26*a* of the second corner 26 has a protruding curved shape, the length of the second portion 40*b* of the minor cutting edge 40 can be sufficiently long. This allows the example of the embodiment of the present disclosure can further improve the surface accuracy of the machined surface of the workpiece W.

If the length of the third portion 40*c* of the minor cutting edge 40 is greater than the length of the first portion 40*a*, the third portion 40*c* as a gentle portion next to the first portion 40*a* of the minor cutting edge 40 can be long next to the second portion 30*b*. This allows the example of the embodiment of the present disclosure can further improve the surface accuracy of the machined surface of the workpiece W.

If the radius of curvature Rc of the third portion 40*c* of the minor cutting edge 40 is larger than the radius of curvature Ra of the first portion 40*a*, stress concentration in the third portion 40*c* to which a large cutting load tends to be applied compared to the first portion 40*a* can be reduced. This allows the example of the embodiment of the present disclosure can improve the durability of the cutting insert 10.

If the distance D1 from the apex portion 40*t* of the minor cutting edge 40 to the second corner 26 is shorter than the distance D2 from the apex portion 40*t* to the second portion 40*b*, the flank face of the lateral surface 16, which is connected to the second corner 26 is unlikely to come into contact with the machined surface of the workpiece W. This allows the example of the embodiment of the present disclosure can improve the durability of the cutting insert 10.

If the boundary 12*p* between the second side 30 and the first corner 24 is closer to the lower surface 14 than the boundary 12*e* between the second side 30 and the second corner 26, the main cutting edge 38 and the minor cutting edge 40 can be gradually brought into contact with the workpiece W from the main cutting edge 38 to the minor cutting edge 40, allowing a rapid increase in cutting resistance to be suppressed. This allows the example of the embodiment of the present disclosure can improve the durability of the cutting insert 10.

Cutting Tool

Figure 5:
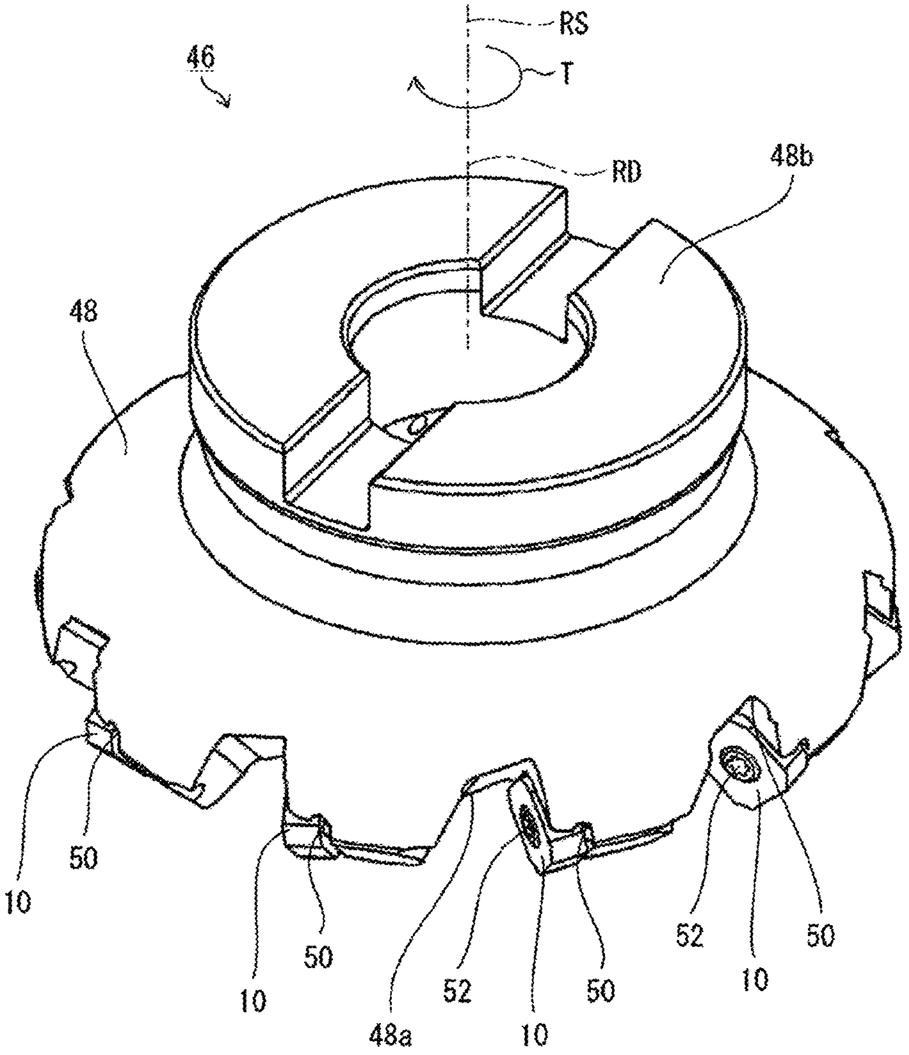
FIG. 5 is a schematic perspective view of a cutting tool according to an embodiment of the present disclosure.
Figure 6:
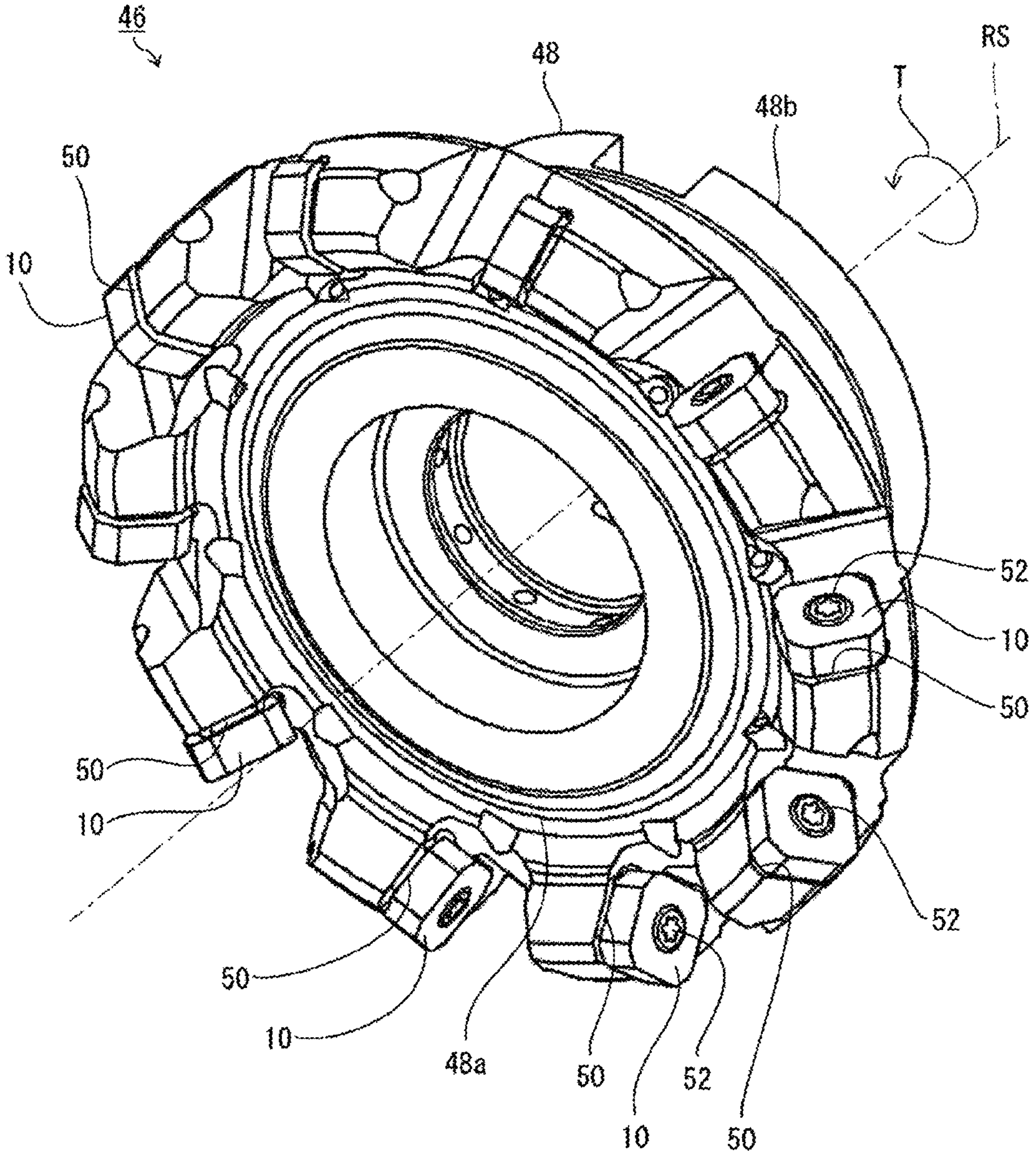
FIG. 6 is a schematic perspective view of the cutting tool illustrated in FIG. 5 viewed at a different angle.

A cutting tool 46 according to the embodiment of the present disclosure will be described with reference to FIG. 5 and FIG. 6. FIG. 5 is a schematic perspective view of the cutting tool 46 according to the embodiment of the present disclosure. FIG. 6 is a schematic perspective view of the cutting tool 46 illustrated in FIG. 5 viewed at a different angle.

As illustrated in the examples in FIG. 5 and FIG. 6, the cutting tool 46 according to the embodiment of the present disclosure is a tool used for machining the workpiece W (see FIG. 7) and rotatable about a rotation axis RS. The cutting tool 46 may include a holder 48 attached to a main spindle of a processing machine such as a milling machine. The holder 48 may have a cylindrical shape extending from a first end 48*a* to a second end 48*b* along the rotation axis RS. Examples of the material of the holder 48 include metals such as stainless steel, carbon steel, cast iron, and an aluminum alloy. A plurality of pockets 50 may be located at intervals in a peripheral direction on the outer peripheral surface of the holder 48. The plurality of pockets 50 may be located at equal intervals in the peripheral direction or at unequal intervals in the peripheral direction. The number of pockets 50 may be one.

As in the examples illustrated in FIG. 5 and FIG. 6, the cutting tool 46 may include the cutting insert 10 located in each of the pockets 50 of the holder 48. The cutting insert 10 may be located only in a selected one or more of the pockets 50 in the holder 48. The cutting insert 10 may be fixed to the pocket 50 of the holder 48 by a fixing screw 52 inserted in the mounting hole 18. The cutting insert 10 may be fixed to the pocket 50 of the holder 48 by a clamp member. If machining is performed by the upper cutting edge 20, the lower surface 14 may be used as a seating surface for attachment to the holder 48 (see FIG. 3). If machining is performed by the lower cutting edge 22, the upper surface 12 may be used as a seating surface (see FIG. 3).

Method for Manufacturing Machined Product

Figure 7:
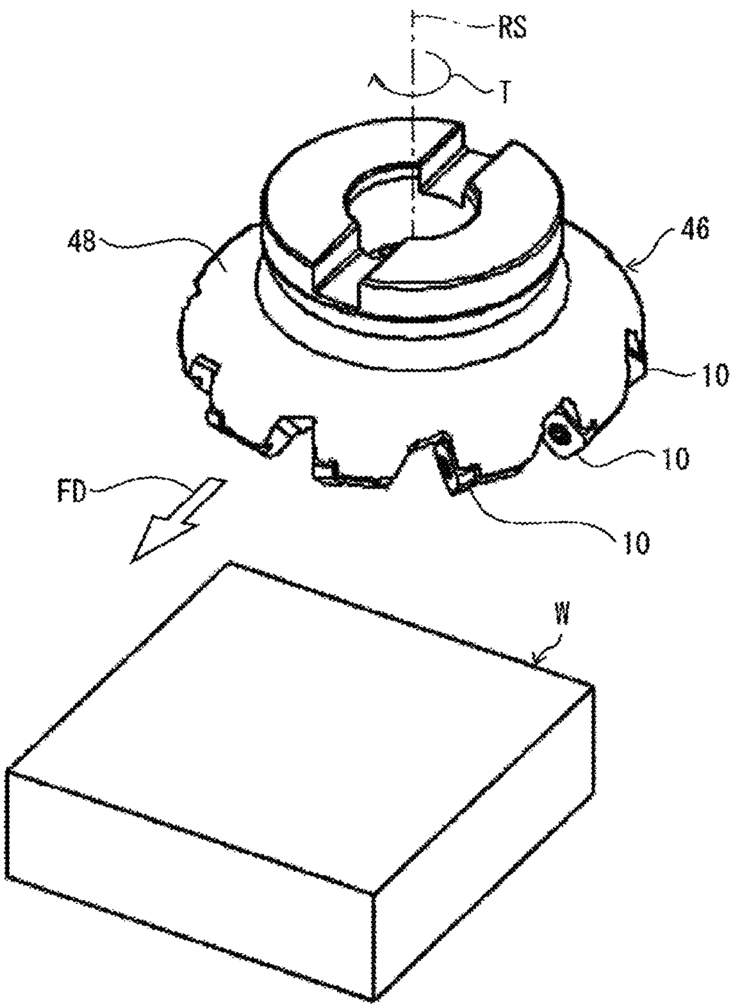
FIG. 7 is a schematic view illustrating a method for manufacturing a machined product according to an embodiment of the present disclosure.
Figure 8:
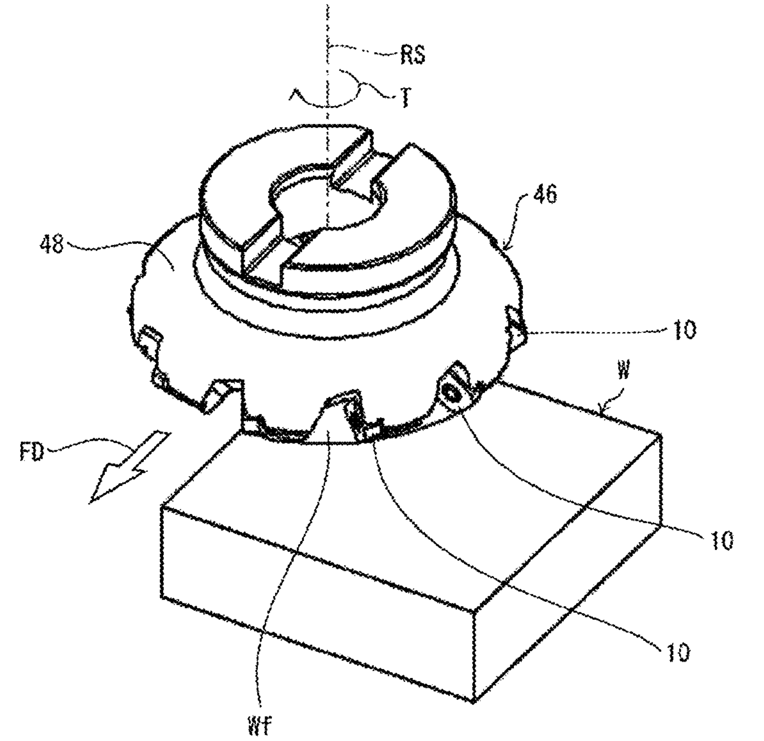
FIG. 8 is a schematic view illustrating the method for manufacturing the machined product according to an embodiment of the present disclosure.
Figure 9:
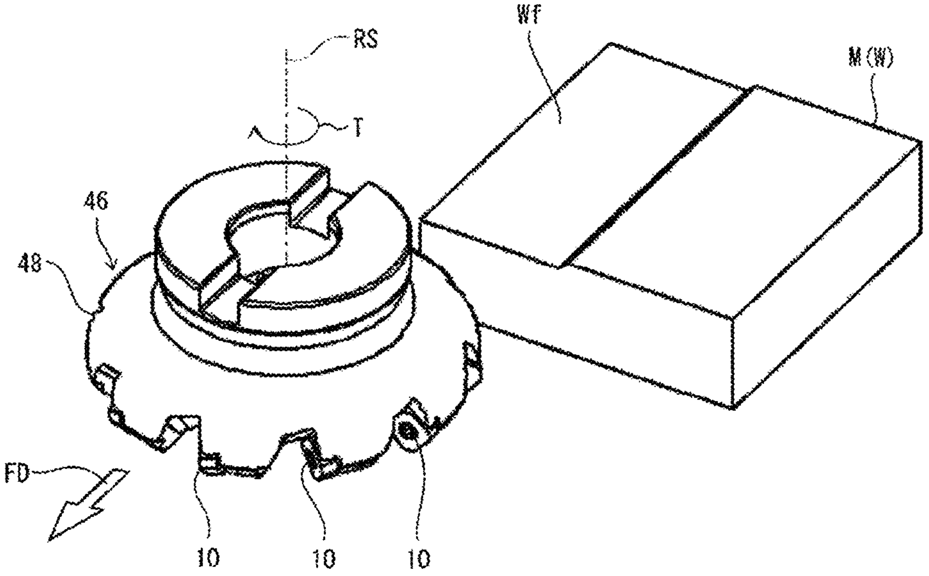
FIG. 9 is a schematic view illustrating the method for manufacturing the machined product according to an embodiment of the present disclosure.

A method for manufacturing the machined product according to the embodiment of the present disclosure will be described with reference to FIGS. 7 to 9. FIGS. 7 to 9 are schematic views illustrating the method for manufacturing the machined product according to the embodiment of the present disclosure.

As in the examples illustrated in FIGS. 7 to 9, the method for manufacturing the machined product according to the embodiment of the present disclosure is a method for manufacturing a machined product M, which is the workpiece W after machined, and includes a first step, a second step, and a third step. The first step is a step of rotating the cutting tool 46. The second step is a step of bringing the cutting tool 46, which is rotating, into contact with the workpiece W. The third step is a step of separating the cutting tool 46 from the workpiece W. Here, examples of the material of the workpiece W include aluminum alloy, stainless steel, carbon steel, alloy steel, cast iron, and non-ferrous metal. The specific content of the method for manufacturing the machined product according to the embodiment of the present disclosure is as follows.

As in the examples illustrated in FIG. 7 and FIG. 8, the cutting tool 46 is moved toward the workpiece W in the direction of an arrow FD while being rotated in a rotation direction T. Then, the cutting insert 10 of the cutting tool 46, which is rotating, is moved in the direction of the arrow FD while being brought into contact with the workpiece W. Thus, machining of the workpiece W is performed by the cutting tool 46, and a machined surface Wf is formed on the workpiece as in the example illustrated in FIG. 9.

Subsequently, as in the example illustrated in FIG. 9, the cutting tool 46 is further moved in the direction of the arrow FD to be separated from the workpiece W. This completes the machining of the workpiece W and enables the machined product M, which is the workpiece W after the machining, to be manufactured. Since the cutting tool 46 has excellent cutting capabilities because of the above reasons, the machined product M having excellent machining accuracy can be manufactured.

If the machining is continued, the cutting insert 10 of the cutting tool 46 simply has to be repeatedly brought into contact with a different portion of the workpiece W while the cutting tool 46 is being rotated. Although the cutting tool 46 is brought close to the workpiece W in the embodiment of the present disclosure, the cutting tool 46 only needs to be brought relatively close to the workpiece W. Accordingly, for example, the workpiece W may be brought close to the cutting tool 46. In this respect, the same procedure is performed in separating the cutting tool 46 from the workpiece W.

In the present disclosure, the invention has been described above based on the drawings and embodiments. However, the invention according to the present disclosure is not limited to the above-described embodiment. In other words, the embodiment of the invention according to the present disclosure can be modified in various ways within the scope illustrated in the present disclosure, and embodiments obtained by appropriately combining the disclosed technical means are also included in the technical scope of the invention according to the present disclosure. In other words, a person skilled in the art can easily make various variations or modifications based on the present disclosure. Note that these variations or modifications are included within the scope of the present disclosure.

The invention claimed is:

1. A cutting insert, comprising:
an upper surface;
a lower surface located on an opposite side of the upper surface;
a lateral surface connected to the upper surface and the lower surface;
a upper cutting edge located on an intersection between the upper surface and the lateral surface; and
a lower cutting edge located on an intersection between the lower surface and the lateral surface, wherein
the upper surface comprises
a first corner,
a first side connected to the first corner, and
a second side connected to the first corner on an opposite side of the first side,
the upper cutting edge comprises
a main cutting edge located on the first side and having a linear shape in a top view,
a minor cutting edge located on the second side and having a linear shape in the top view, and
a connection edge located on the first corner, connected to the main cutting edge and the minor cutting edge, and having a protruding curved shape protruding outward in the top view,
the minor cutting edge has a protruding curved shape protruding upward in a side view and comprises
a first portion comprising an apex portion protruding most upward in the minor cutting edge,
a second portion located between the first portion and the connection edge, and
a third portion located between the second portion and the connection edge,
each of the second portion and the third portion comes close to the lower surface with distance from the first portion, and
in the side view, a radius of curvature of the second portion is larger than a radius of curvature of the first portion and a radius of curvature of the third portion.

2. The cutting insert according to claim 1, wherein the radius of curvature of the third portion is larger than the radius of curvature of the first portion.

3. The cutting insert according to claim 1, wherein a length of the second portion is greater than a length of the first portion and a length of the third portion.

4. The cutting insert according to claim 3, wherein the length of the third portion is greater than the length of the first portion.

5. The cutting insert according to claim 1, wherein
the upper surface further comprises a second corner connected to the second side on an opposite side of the first corner, and a distance from the apex portion to the second corner is shorter than a distance from the apex portion to the second portion.

6. The cutting insert according to claim 5, wherein a boundary between the second side and the first corner is closer to the lower surface than a boundary between the second side and the second corner is.

7. The cutting insert according to claim 5, wherein the first corner comprises a first connection region connected to the second side, the second corner comprises a second connection region connected to the second side, and in the side view, the first connection region has a recessed curved shape recessed downward, and the second connection region has a protruding curved shape protruding upward.

8. A cutting tool, comprising:

a holder having a cylindrical shape extending from a first end to a second end along a rotation axis and comprising a pocket located on a side of the first end; and the cutting insert according to claim 1 located in the pocket.

9. A method for manufacturing a machined product, the method comprising:

rotating the cutting tool according to claim 8;

bringing the cutting tool rotating into contact with a workpiece; and separating the cutting tool from the workpiece.

* * * * *